Sept. 9, 1958 R. A. SMITH 2,851,127
VEHICLE WHEEL CHOCK
Filed Feb. 25, 1957
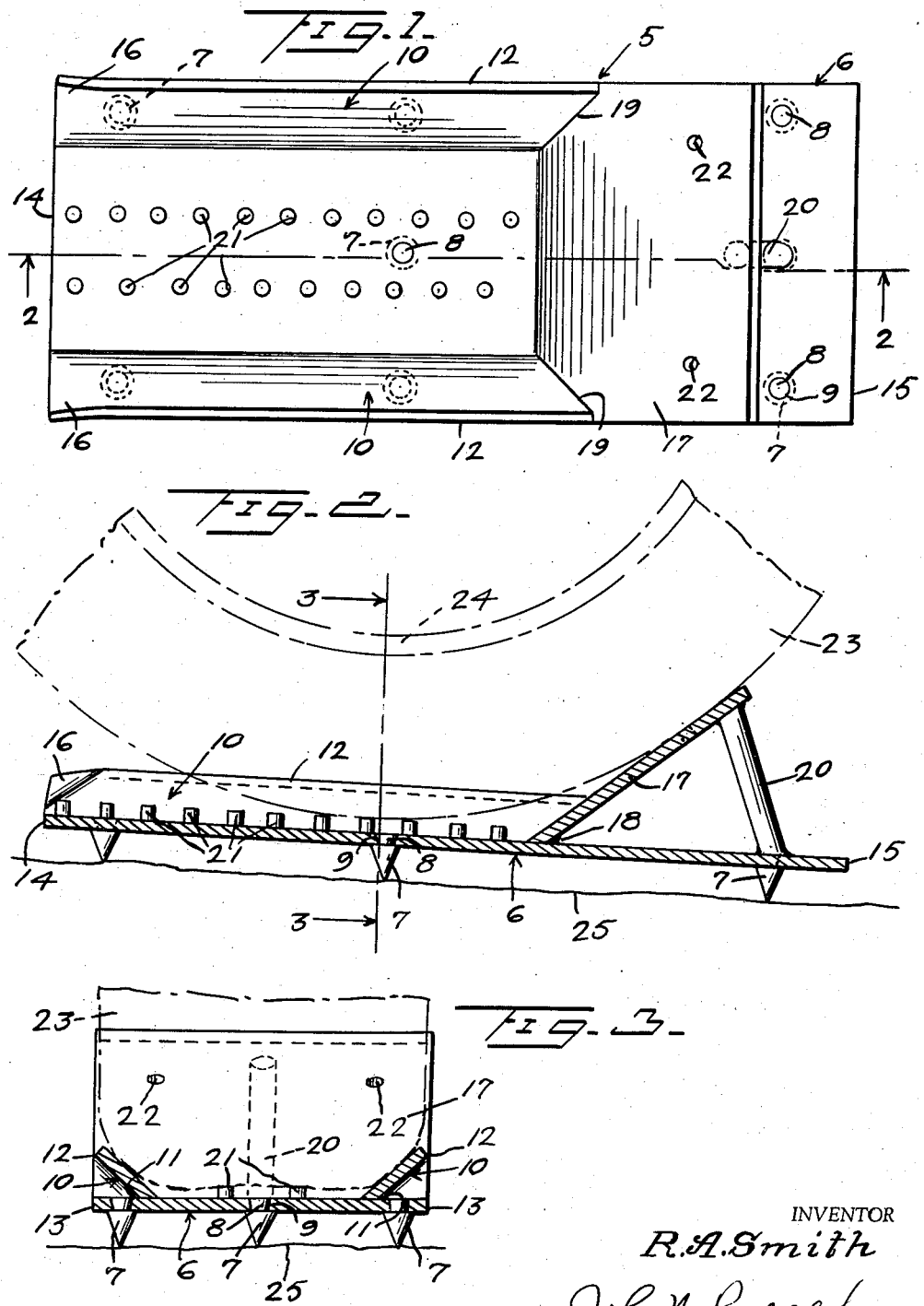
INVENTOR
R. A. Smith
BY John N. Randolph
ATTORNEY

United States Patent Office 2,851,127
Patented Sept. 9, 1958

2,851,127

VEHICLE WHEEL CHOCK

Ray A. Smith, Breinigsville, Pa.

Application February 25, 1957, Serial No. 641,956

1 Claim. (Cl. 188—32)

This invention relates to an improved wheel chock for motor vehicle wheels and has for its primary object to provide a device which will effectively hold a vehicle wheel against movement in any direction while the wheel, located laterally opposite thereto, is jacked up for replacing a wheel having a flat tire or for applying a skid chain to the elevated wheel.

Considerable difficulty and risk are present where it is necessary to jack up a vehicle wheel on a slippery surface due to the fact that the wheel located opposite to the elevated wheel frequently slips laterally, forwardly or rearwardly, any of which movements will cause the jack to overturn and releases the elevated wheel.

Accordingly, it is an object of the present invention to provide a wheel chock which will effectively prevent any slippage of a wheel located laterally opposite to a wheel which is being jacked up to effectively prevent any movement of the vehicle which might tend to overturn or release the jack.

Various other objects and advantages of the invention will hereinafter become more fully apparent from the following description of the drawing, illustrating a presently preferred embodiment thereof, and wherein:

Figure 1 is a plan view of the wheel chock;

Figure 2 is a longitudinal sectional view thereof, taken substantially along a plane as indicated by the line 2—2 of Figure 1 and showing a portion of a vehicle tire and wheel in broken lines positioned on the wheel chock, and Figure 3 is a cross sectional view of the wheel chock, taken substantially along a plane as indicated by the line 3—3 of Figure 2.

Referring more specifically to the drawing, the wheel chock in its entirety is designated generally 5 and includes an elongated flat metal base plate 6. A plurality of calks 7 are fixed to the plate 6 and depend from the underside thereof. Said calks 7 are each provided with a restricted upwardly extending shank 8 which is anchored in an opening 9 of the plate 6.

The wheel chock 5 includes corresponding side flanges 10 which extend longitudinally of the base plate 6 and which have bottom longitudinal edges disposed on and secured to the upper side of the base plate 6 in any suitable manner, as by welding, as seen at 11. The bottom edges of the flanges 10 are secured to the plate 6, near to but spaced from the longitudinal side edges of said plate, and said flanges 10 are inclined upwardly and outwardly and have upper edges 12 which are disposed almost directly above the side edges 13 of the plate 6, as best seen in Figure 3. The flanges 10 extend from a forward end 14 of the plate 6 to a point spaced from the opposite rear end 15 of said plate. The upper corners of the flanges 10 are flared outwardly as seen at 16 at the forward end 14 of the plate 6.

A chock plate 17 has a lower end secured as by welding, as seen at 18, to the upper side of the base plate 6. The chock plate 17 is of a width corresponding to the width of the base plate 6 and the lower end thereof is disposed crosswise of said base plate and is located between the rear end 15 of the base plate and the adjacent ends of the side flanges 10. The chock plate 17 extends upwardly at an incline from the base plate 6 in a direction away from the forward end 14 of the plate 6. The inner ends 19 of the flanges 10 are beveled to abut against portions of the upper side of the chock plate 17. A brace 20 has a lower end secured to the upper side of the plate 6, near the end 15 thereof, and extends upwardly at an incline away from said end 15 and has its upper end secured to the underside of the chock plate 17, near the upper end thereof.

The portion of the base plate 6 located between the flanges 10 is provided with a plurality of spaced upwardly projecting studs or bosses 21. The chock plate 17, near its upper edge, is provided with openings 22 which may engage any suitable suspending element, by means of which the wheel chock 5 may be hung up for storage.

All of the parts forming the wheel chock 5 are preferably constructed of metal of sufficient thickness and rigidity to adequately support the weight normally supported by a vehicle wheel and tire. The wheel chock 5 is positioned either in front of or behind the bottom portion of a tire 23 and wheel 24, which is located laterally opposite to the tire and wheel to be jacked up, and said wheel chock 5 is disposed so that the forward end 14 thereof is located against a portion of the tread of the tire 23 or immediately adjacent thereto. The positioning of the wheel chock 5 in front of or behind the tire 23 is governed by the slope of the surface 25 on which the tire 23 is resting. The wheel chock 5 is positioned in alignment with the tire 23 and so as to extend downwardly and away from the tire. The vehicle is then moved either forwardly or rearwardly to cause the tire 23 to roll onto the end 14 of the base and along said base until a portion of the tire tread rests against the upper side of the chock plate 17. With the tire 23 thus disposed, as seen in Figure 2, it will be apparent that the tire will be cradled between the chock plate 17 and the portion of the base plate 6 disposed between said chock plate 17 and its forward end 14, which parts will provide two surfaces sloping in opposite directions against which the tire 23 bears. The spacing between the flanges 10 is less than the width of the tire 23 so that the side edge portions of the tread of the tire will be compressed and gripped between the flanges 10. In addition, certain of the studs or bosses 21 will be in engagement with a portion of the tread of the tire 23. Thus, the tire will be held against movement in any direction relative to the wheel chock 5, until the tire and wheel are actually driven off of the wheel chock. The calks 7 will bite into the surface 25 to prevent slippage of the wheel chock relative to said surface if said surface is slippery, as by being wet or covered with ice. It will also be apparent that if the surface is soft or muddy or covered with snow, that the calks 7 will be embedded therein to prevent slippage of the wheel chock 5 relative thereto. It will thus be readily apparent that the tire 23 and wheel 24 will be held against movement in any direction relative to the wheel chock 5 and that the wheel chock 5 will in turn be held against movement in any direction relative to the surface 25, so that no movement of the vehicle can occur which might cause release or overturning of a jack, not shown, by means of which the laterally opposite vehicle wheel is supported in an elevated position. The studs or bosses 21 also function to prevent slippage of the tire 23 relative to the wheel chock 5 as the tire is being driven onto or off of said wheel chock.

The wheel chock 5 may be made in various widths for use with tires of different widths, and various other modifications and changes are contemplated and may be resorted to, without departing from the function or scope of the invention as hereinafter defined by the appended claim.

I claim as my invention:

A wheel chock comprising an elongated substantially flat rigid base plate having a forward end and a rear end, a rigid chock plate having a lower end secured to an upper side of the base plate, near to but spaced from the rear end thereof and extending crosswise of the base plate, said chock plate extending upwardly at an incline from the base plate in a direction away from said forward end of the base plate, flanges secured to the upper side of the base plate and extending longitudinally thereof between the forward end of the base plate and said chock plate, said flanges being laterally spaced relative to one another and extending upwardly at an incline away from one another, the upper side of the base plate portion disposed between the flanges being adapted to be engaged by a portion of the tread of a tire which is supported on said base plate between said flanges and with another portion of the tire tread resting against the chock plate portion, the tire being movable onto and off of the base plate at the forward end thereof, said flanges having outwardly bent corners located at the forward end of the base plate adapted to prevent pinching of the tire as it rolls onto the wheel chock, a plurality of calks fixed to and depending from the base plate and adapted to prevent slippage of the wheel chock relative to a supporting surface thereof, said base plate having upstanding studs disposed between said flanges and adapted to be engaged by said tread portion to prevent slippage of the tire relative to the wheel chock, and a brace having an upper end secured to the underside of the upper portion of said chock plate and extending downwardly and outwardly therefrom and heaving a lower end secured to the base plate near the rear end of the base plate.

References Cited in the file of this patent
UNITED STATES PATENTS

| | | |
|---|---|---|
| 1,077,546 | O'brien | Nov. 4, 1913 |
| 1,237,108 | Shiel | Aug. 14, 1917 |
| 2,143,553 | Hamaguchi | Jan. 10, 1939 |
| 2,237,214 | Burkart | Apr. 1, 1941 |
| 2,521,539 | Richardson | Sept. 5, 1950 |
| 2,719,610 | Allison | Oct. 4, 1955 |